United States Patent
Walker et al.

(10) Patent No.: US 9,307,091 B2
(45) Date of Patent: *Apr. 5, 2016

(54) METHOD AND APPARATUS FOR THE SECURE STORAGE OF AUDIO SIGNALS

(71) Applicant: Zynga Inc., San Francisco, CA (US)

(72) Inventors: Jay S. Walker, San Francisco, CA (US); Thomas M. Sparico, San Francisco, CA (US); James A. Jorasch, San Francisco, CA (US)

(73) Assignee: Zynga Inc., San Francisco, CA (US)

(*) Notice: Subject to any disclaimer, the term of this patent is extended or adjusted under 35 U.S.C. 154(b) by 26 days.

This patent is subject to a terminal disclaimer.

(21) Appl. No.: 14/165,480

(22) Filed: Jan. 27, 2014

(65) Prior Publication Data

US 2014/0177838 A1      Jun. 26, 2014

Related U.S. Application Data

(63) Continuation of application No. 13/270,754, filed on Oct. 11, 2011, now Pat. No. 8,675,837, which is a continuation of application No. 12/421,769, filed on Apr. 10, 2009, now Pat. No. 8,037,321, which is a continuation of application No. 11/183,359, filed on Jul. 18, 2005, now Pat. No. 7,519,836, which is a continuation of application No. 10/359,519, filed on Feb. 5, 2003, now Pat. No. 6,988,205, which is a continuation of application No. 08/914,165, filed on Aug. 19, 1997, now Pat. No. 6,529,602.

(51) Int. Cl.
| | |
|---|---|
| *H04M 11/00* | (2006.01) |
| *H04M 7/00* | (2006.01) |
| *H04K 1/00* | (2006.01) |
| *H04M 3/42* | (2006.01) |
| *H04L 9/08* | (2006.01) |
| *H04L 9/32* | (2006.01) |
| *H04M 3/38* | (2006.01) |
| *H04M 3/51* | (2006.01) |

(52) U.S. Cl.
CPC ............. *H04M 7/0078* (2013.01); *H04K 1/00* (2013.01); *H04L 9/083* (2013.01); *H04L 9/0819* (2013.01); *H04L 9/3226* (2013.01); *H04M 3/42221* (2013.01); *H04L 2209/56* (2013.01); *H04M 3/38* (2013.01); *H04M 3/382* (2013.01); *H04M 3/51* (2013.01); *H04M 2203/258* (2013.01); *H04M 2203/301* (2013.01); *H04M 2203/6009* (2013.01); *H04M 2203/609* (2013.01)

(58) Field of Classification Search
USPC .................. 379/67.1, 88.01, 157, 158, 201.1
See application file for complete search history.

(56) References Cited

U.S. PATENT DOCUMENTS

| | | | | |
|---|---|---|---|---|
| 4,423,287 | A * | 12/1983 | Zeidler | G06Q 20/02 340/5.41 |
| 6,137,885 | A * | 10/2000 | Totaro | H04B 7/18563 380/247 |
| 6,437,885 | B1 * | 8/2002 | Duncan | G01R 15/245 359/280 |

(Continued)

*Primary Examiner* — Maria El-Zoobi
(74) *Attorney, Agent, or Firm* — Martine Penilla Group, LLP

(57) ABSTRACT

In one embodiment, a method, system and apparatus for recording audio is provided so that the recording can be authenticated. The system may be implemented as a central server that is accessed via one or more lines for audio communication, or as a stand-alone unit. The system operates by encrypting communicated data (e.g., audio signals), storing the encrypted information, and providing at least one user with a key that can be used to decrypt the stored information.

20 Claims, 15 Drawing Sheets

(56) References Cited

U.S. PATENT DOCUMENTS

| | | | |
|---|---|---|---|
| 6,523,117 B2 * | 2/2003 | Oki | G06F 21/10 380/44 |
| 6,529,602 B1 * | 3/2003 | Walker | H04K 1/00 379/67.1 |
| 6,988,205 B2 * | 1/2006 | Walker | H04K 1/00 379/67.1 |
| 7,519,836 B2 * | 4/2009 | Walker | H04K 1/00 380/277 |
| 7,769,176 B2 * | 8/2010 | Watson | G06Q 20/3674 380/200 |

* cited by examiner

SINGLE PARTY ACCESS FOR CALL PLAYBACK

| MESSAGE ID NUMBER | DATE | NAME (FIRST PARTY) | PHONE NUMBER OF FIRST PARTY | PHONE NUMBER OF SECOND PARTY | MESSAGE START TIME (EST) | MESSAGE END TIME (EST) | SECURITY LEVEL |
|---|---|---|---|---|---|---|---|
| 943798574 | 01/04/97 | SUE SIMMS | 555-1111 | 555-2222 | 4:30:23.00 PM | 5:00:23.00 PM | 2 |
| 347358722 | 02/02/97 | BOB SMITH | 555-3333 | 555-4444 | 1:17:00.00 PM | 1:29:30.10 PM | 3 |
| 7098038509 | 02/03/97 | BILL HENDERSON | 555-5555 | 555-6666 | 9:05:00.00 PM | 9:10:10.00 PM | 4 |

| MESSAGE ID NUMBER | FIRST PARTY ACCESS CODE | SECOND PARTY ACCESS CODE |
|---|---|---|
| 943798574 | 933798574 | 235625147 |
| 347358722 | 347358722 | 235417458 |
| 7098038509 | 7098038509 | 147859235 |

| NAME | CALLER ID NUMBER | ANI | MESSAGE ID NUMBERS |
|---|---|---|---|
| SUE SIMMS | 83229822 | 203-614-3242 | 943798574 |
| BOB SMITH | 989489 | 203-614-3295 | 3473558722 |
| BILL HENDERSON | 698436 | 203-614-3234 | 7098038509 |

FIG. 5A

| MESSAGE ID NUMBER | MESSAGE (ENCRYPTED) |
|---|---|
| 973798574 | 001230123 |
| 3473558722 | 43211234 46789012 |
| 7098038509 | 12348999 0876084 |

METHOD AND APPARATUS FOR THE SECURE STORAGE OF AUDIO SIGNALS

CLAIM OF PRIORITY

This application is a continuation of co-pending U.S. patent application Ser. No. 13/270,754, filed on Oct. 11, 2011, entitled "Method and Apparatus for the Secure Storage of Audio Signals", which is a continuation of U.S. patent application Ser. No. 12/421,769 filed Apr. 10, 2009, now U.S. Pat. No. 8,037,321, issued on Oct. 11, 2011, entitled "Method and Apparatus for the Secure Storage of Audio Signals", which is a continuation of U.S. patent application Ser. No. 11/183,359, filed Jul. 18, 2005, now U.S. Pat. No. 7,519,836, issued on Apr. 14, 2009, entitled "Method and Apparatus for the Secure Storage of Audio Signals", which is a continuation of U.S. patent application Ser. No. 10/359,519, filed Feb. 5, 2003, now U.S. Pat. No. 6,988,205, issued Jan. 17, 2006, entitled "Method and Apparatus for the Secure Storage of Audio Signals", which is a continuation of U.S. patent application Ser. No. 08/914,165, filed Aug. 19, 1997, now U.S. Pat. No. 6,529,602, issued on Mar. 4, 2003, entitled "Method and Apparatus for the Secure Storage of Audio Signals". The entirety of the above-referenced applications are incorporated by reference herein for all purposes.

BACKGROUND OF THE INVENTION

This invention relates to a method and apparatus for recording audio information in an authenticatable, tamper-proof manner.

Traditionally, written documents have been used to provide permanent records of transactions and agreements. One example of this type of document is a contract for the sale of an item, which typically identifies the name of the parties, the date, the subject matter of the contract, and a price. The contract provides a permanent record that can be used at a later date to establish the terms of the agreement between the parties.

Oral contracts, on the other hand, do not provide a permanent record of the terms of the agreement. As a result, if a dispute arises over the terms of the agreement at a later date, it becomes difficult to prove exactly what the parties agreed to, or whether they made a binding contract at all. Because there is no permanent record, an unscrupulous party could be untruthful about the agreed-upon terms to escape his obligations. Even absent dishonesty, parties to an oral contract may have different recollections of exactly what they agreed to. Moreover, one of the persons who entered into the agreement may be permanently or temporarily unavailable. These problems tend to worsen as time passes.

Because of these problems, all states have statutes declaring that certain oral agreements are unenforceable, typically including the sale of land, and the sale of goods exceeding a certain value. If a trustworthy record of an oral agreement or transaction could be obtained, however, the problems of oral agreements could be overcome.

Existing methods of recording conversations, however, do not address these problems. For example, telephone answering machines, tape recorders, and handheld digital audio recording devices can be used to record a voice or a conversation. It is, however, relatively easy to delete or to alter the recorded audio information. In particular, readily available electronic devices can splice sections out of an audio conversation, and can even rearrange words to make it appear that a party said something that was never actually said. Moreover, there is no effective way for parties to sign an audio recording.

As a result, it may be difficult to identify the parties that actually agreed to the terms contained in an audio conversation and intended to abide by such terms. Further, there is no way known to applicants to verify that an oral negotiation matured into an agreement.

In addition, existing telephone answering machines and tape recorders do not provide a reliable indication of when the conversation occurred. While some answering machines do record the time a call was received, this "time stamp" is extremely unreliable because a party could rerecord a new time over the time recorded by the answering machine. Alternatively, a party might either intentionally or accidentally set the date on an answering machine incorrectly. This would allow two corroborating parties to pretend that they made an agreement on a certain date, even though the agreement was not made until a later date. As a result, telephone answering machines and ordinary cassette recorders do not alleviate the problems of oral agreements described above.

STEN-TEL is an example of a system designed specifically for recording telephonic audio information. STEN-TEL is available from Sten-tel Inc. (having a place of business at 66 Long Wharf, Boston, Mass. 02110). To use STEN-TEL, a person places a telephone call to the STEN-TEL server, and the server digitally records the telephone call. After the digital recording is made, a transcriptionist accesses the recording and generates a typed record of the telephone call. The typed transcription is then uploaded to the server, where it is stored. Permanent storage of the digitally recorded audio conversation is optional. After the transcription is stored in the server, it can be downloaded to the users. Every transcription is assigned a unique identification number, and all status information is maintained in a centralized database.

The STEN-TEL system does not, however, overcome the drawbacks of existing telephone answering machines and audiocassette recorders. First, the ability to restrict access to files is limited or non-existent. Apparently any person who has the file identifier can access the stored information. Second, the information is vulnerable to tampering. Third, although STEN-TEL apparently stores the time of the call, time stamps are not embedded into the stored information. This makes STEN-TEL vulnerable to modifications of the stored date for a given conversation. Finally, digital signatures are not used to provide security and/or authenticate the parties.

One system that does incorporate certain security features is described in U.S. Pat. No. 5,594,798 (Cox et al.), which describes a voice messaging system. In Cox's system, however, an encryption key is stored along with the encrypted message. Because a hacker could obtain access to the encrypted message by retrieving the encryption key, Cox's system is vulnerable to attack. In addition, Cox's system is intended for use with secure telephone devices (STD). Ordinary telephones cannot call into Cox's system to have an audio message recorded.

No existing audio recording system is known to applicants that facilitates the permanent recording of an audio conversation in an authenticatable form so that a user can simply place a telephone call to a central server and have the server encrypt the conversation and record the time of the conversation, all in a tamper-proof manner.

SUMMARY OF THE INVENTION

This invention advantageously provides a user-accessible system that can record audio conversations in a secure manner, whereby both the content and the time of the conversation are authenticatable.

One aspect of the invention provides an apparatus and a corresponding process that includes a signal-receiving interface, an encryption processor for encrypting the received signals, and a storage device for storing the encrypted signals. A crypto-key generator generates and transmits a crypto-key, and a message ID generator generates and transmits a message ID. A database stores the message ID so that it is associated with the stored signals.

Another aspect of the invention provides an apparatus and a corresponding process that includes an audio signal receiving interface for receiving audio signals from two sources, an encryption processor for encrypting the received audio signals, and a storage device for storing the encrypted signals. A crypto-key generator generates and transmits a crypto-key to two destinations, and a message ID generator generates and transmits a message ID to the two destinations. A database stores the message ID so that it is associated with the stored signals.

Another aspect of the invention provides an apparatus and a corresponding process that includes an interface for receiving audio signals from two sources, an encryption processor for encrypting the received audio signals, and a storage device for storing the encrypted audio signals. A crypto-key generator generates two crypto-keys and transmits them to two destinations, respectively. A message ID generator generates and transmits a message ID to the two destinations. A database stores the message ID so that it is associated with the stored signals.

Another aspect of the invention provides an apparatus and a corresponding process that includes a number of audio signal receiving interfaces, and an encryption processor for encrypting the audio signals arriving from those interfaces. Encrypted audio signals, corresponding to a time during which a given one of the audio signal receiving interfaces is active, are generated and stored. Crypto-keys and message IDs are generated and distributed for each stored signal. A database stores the message ID so that it is associated with the stored signals.

Another aspect of the invention provides a system and a corresponding process that establishes an audio connection with a calling party, receives an audio communication from the calling party, and encrypts the audio communication. The encrypted audio communication is stored, and a code for decrypting the encrypted audio communication is provided to the calling party.

Another aspect of the invention provides a system and a corresponding process that establishes an audio connection with at least two parties, accesses an audio communication between the parties, and encrypts the audio communication. A key, which can be used to decrypt the encrypted audio recording, is generated. At least two access codes are also generated; any of which can be used to obtain access to the encrypted audio recording. The key is transmitted to all the parties, and one of the access codes is transmitted to each party so that each party receives a unique access code.

Another aspect of the invention provides a system and a corresponding process that includes means for establishing an audio connection with the parties, means for accessing an audio communication between the parties, and means for encrypting the audio communication. At least two keys are generated; any of which can be used to decrypt the encrypted audio recording. They are transmitted to the parties so that each party receives a unique key.

Another aspect of the invention provides a process that includes the steps of establishing an audio connection between at least two parties and a remote recording device, and transmitting an audio communication between the parties. The process also includes the steps of receiving from the recording device, for each of the parties, a message ID, a cryptographic key, and one of a plurality of access codes. These items are required for future playback of the audio communication recorded by the remote recording device.

BRIEF DESCRIPTION OF THE DRAWINGS

FIG. 3 is a table describing a preferred set of fields for the message database of FIG. 2.

FIG. 4 is a table describing a preferred set of fields for the message access database of FIG. 2.

FIG. 5A is a table describing a preferred set of fields for the caller database of FIG. 2.

DETAILED DESCRIPTION OF THE PREFERRED EMBODIMENT

FIGS. 1A-1E are included to describe the high-level operation of the invention, further details of which are set out herein below.

Figure 1A:
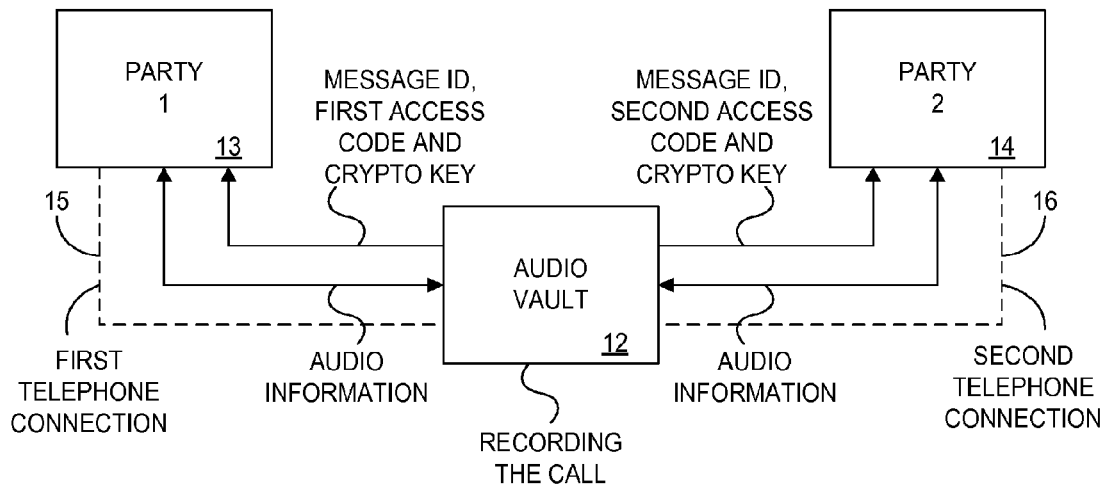
FIG. 1A is a block diagram depicting the flow of information for recording audio information from two parties in accordance with this invention.

FIG. 1A is a system overview of an audio recording system that applicants refer to as the "audio vault". This first-described embodiment is used to record a conversation between two parties 13 and 14 linked to an audio vault 12 via a pair of conventional telephone connections 15 and 16. A first telephone connection 15 is established with the first 13 party and a second telephone connection 16 is established with the second party 14. The audio vault conferences both telephone connections 15 and 16 together so that the two parties 13 and 14 can converse with one another. Because two telephone connections 15 and 16 are used, the audio vault can send individual information to each party without revealing that information to the other party.

As the parties converse with each other, the audio vault 12 monitors the call, digitizes and encrypts the conversation, and records the encrypted information. A message ID, a crypto-key, and access codes are distributed to the parties for subsequent use for playback.

Figure 1B:
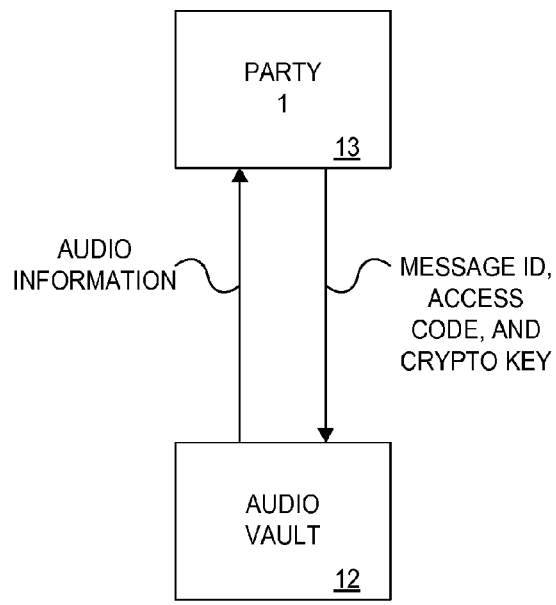
FIG. 1B is a block diagram depicting the flow of information for playing back previously recorded information from two parties in accordance with this invention.

FIG. 1B depicts the standard playback mode of the audio vault. In this mode, any party, 13 or 14 that participated in the original conversation can play back the recorded conversation. The party calls up the audio vault, using an ordinary telephone connection 15, and provides the message ID number, the crypto-key, and their individual access code. The audio vault then decrypts the stored information using the crypto-key and plays the decrypted conversation back to the party.

In an alternative embodiment, in lieu of sending the audio information over ordinary telephone lines, the participating party can access the information via computer network connections or the Internet. In the latter case, the party would provide the required access code and crypto-key via a website. The audio information would then be downloaded to a terminal.

Figure 1C:
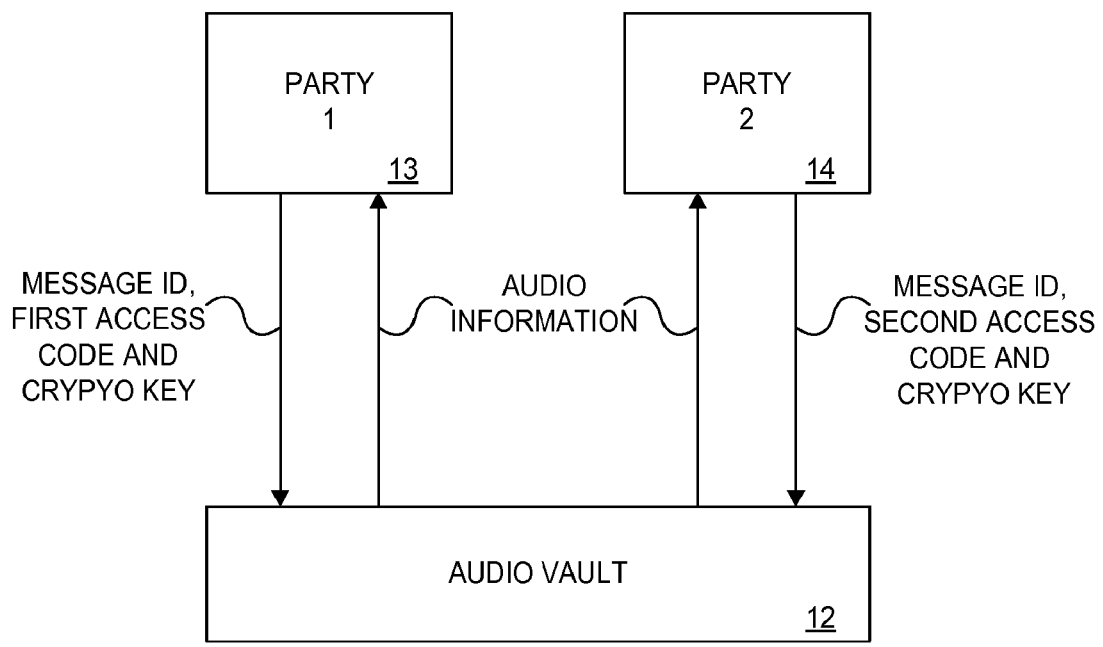
FIG. 1C is a block diagram depicting the flow of information for modifying or deleting previously recorded information from two parties in accordance with this invention.

FIG. 1C depicts a second playback mode in which modification of the recorded information can be affected. In accordance with a feature of the invention, authorization from both of the parties to the conversation must be received before the audio vault can modify stored information. Thus, the audio vault can modify or delete a call only if both parties 13 and 14 provide their individual access codes to the audio vault 12 via the respective telephone connections 15 and 16, and at least one of the parties 13 or 14 also provide the message ID number and the crypto key. The audio vault can not modify a recording without authorization from all of the parties to the recording.

Figure 1D:
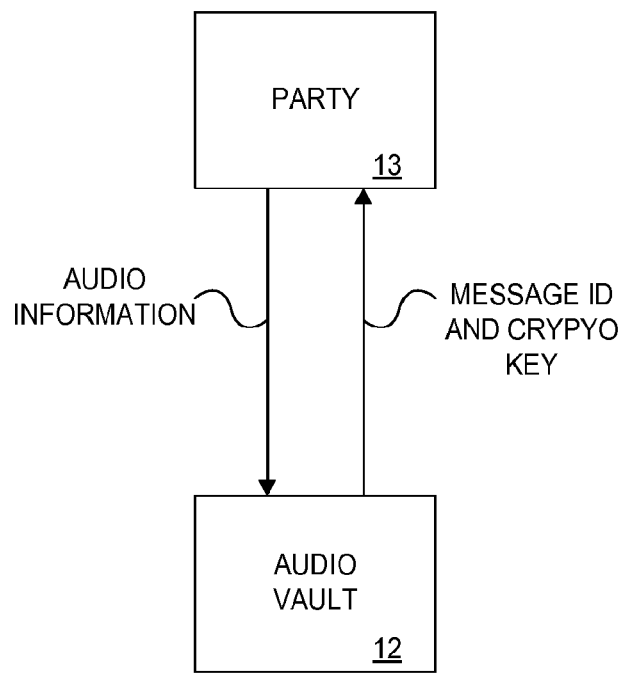
FIG. 1D is a block diagram depicting the flow of information for recording audio information from one party in accordance with this invention.

While the embodiment described above works with two users 13 and 14 linked to the audio vault 12 using respective telephone connections 15 and 16, the embodiment of the audio vault shown in FIG. 1D operates to record audio input from a single telephone line. In this embodiment, the audio vault can serve a single user at a remote location. Alternatively, this embodiment may be used to record a conversation between multiple parties if the parties place a conference call with a single connection to the audio vault. In this embodiment, the audio vault 12 receives the audio information on a single connection and provides the calling party(s) with a single message ID and a crypto-key that can be used to retrieve the audio information.

In yet another embodiment, also represented by FIG. 1D, the audio vault is configured as a stand-alone unit and is not connected to a telephone line. In this embodiment, the audio vault is similar to a tape recorder or a "Voice-It" handheld digital audio recorder, but adds cryptography and time stamping to provide security, as explained further below.

Figure 1E:
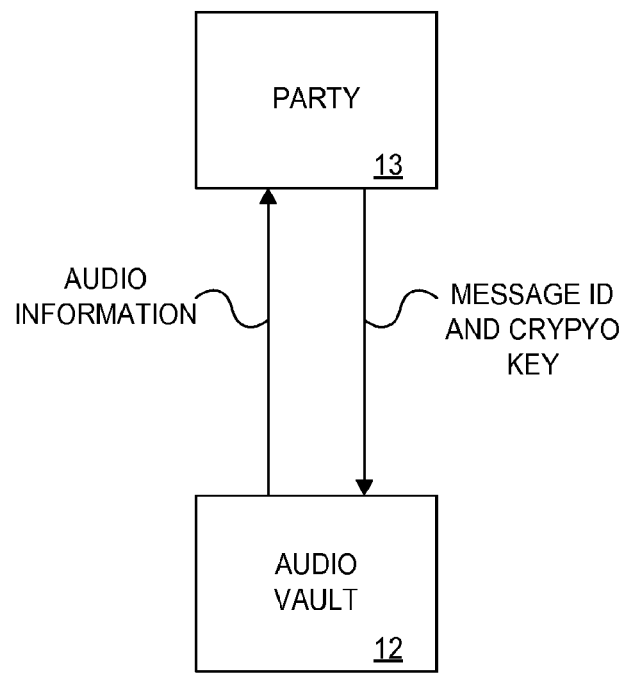
FIG. 1E is a block diagram depicting the flow of information for playing back previously recorded information from one party in accordance with this invention.

FIG. 1E represents the playback of information from the embodiments of the audio vault shown in FIG. 1D (i.e. the single line telephone embodiment or the stand-alone embodiment). When the party 13 provides the message ID and the crypto-key, the audio vault 12 will decrypt and plays back the recorded audio information.

Figure 2:
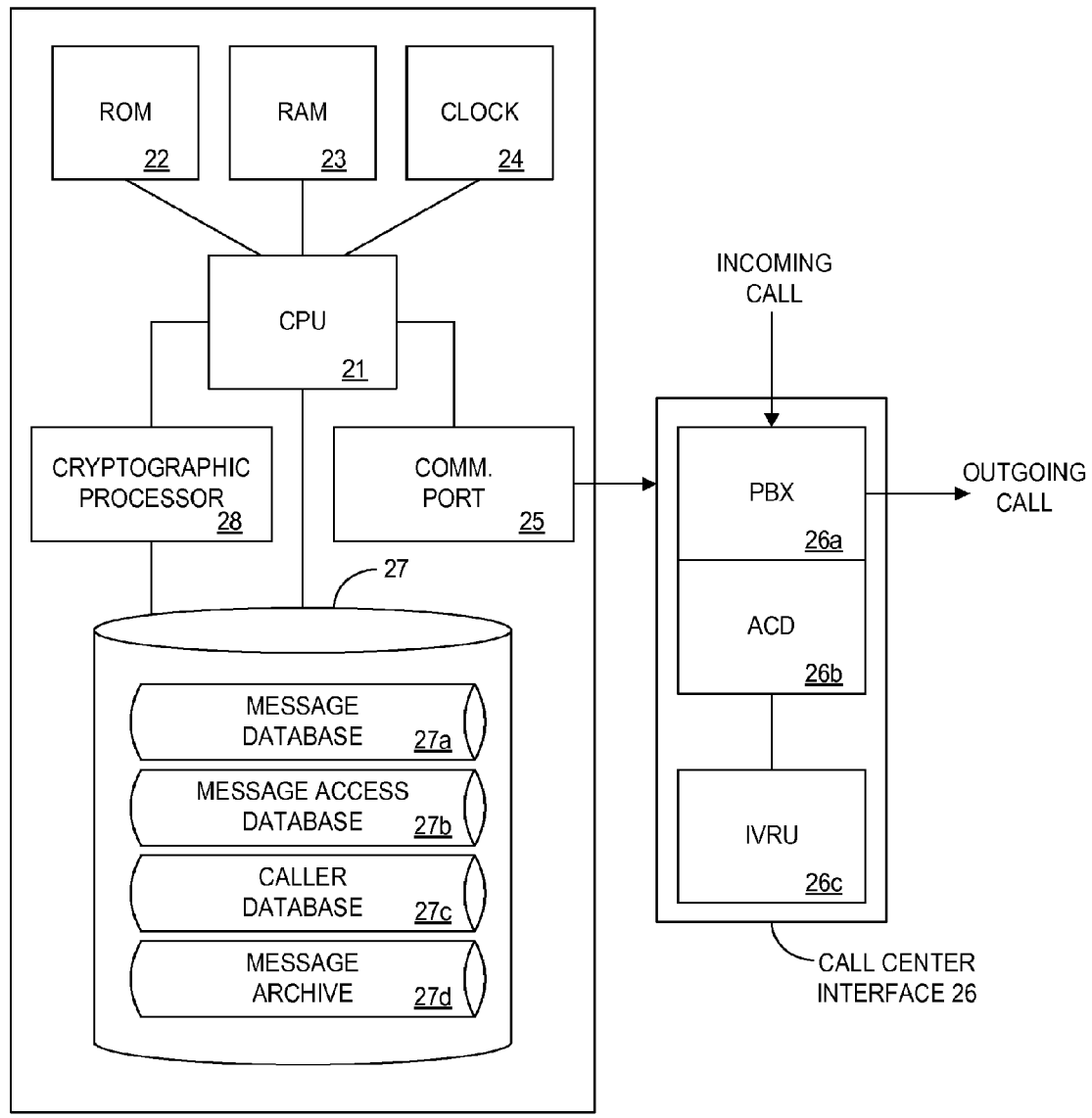
FIG. 2 is a block diagram showing a preferred embodiment of a server in accordance with this invention.

FIG. 2 is a block diagram of one embodiment of audio vault 12. The audio vault includes a CPU 21 that performs the processing functions. It also includes a read only memory 22 (ROM) and a random access memory 23 (RAM). The ROM 22 is used to store at least some of the program instructions that are to be executed by the CPU 21, such as portions of the operating system or BIOS, and the RAM 23 is used for temporary storage of data. A clock circuit 24 provides a clock signal, which is required by the CPU 21. The interconnection and function of a CPU in conjunction with ROM, RAM, and a clock circuit is well known to those skilled in the art of CPU-based electronic circuit design.

The audio vault 12 further includes a communication port 25 connected to CPU 21 that enables the CPU 21 to communicate with devices external to the audio vault. In particular, the communication port 25 facilitates communication between call center interface (CCI) 26 and the CPU 21, so that information arriving from the CCI 26 can be processed by the CPU 21, and the CPU 21 can send information to users via the CCI 26. Preferably, the CCI includes a private branch exchange (PBX) 26a that can switch multiple telephone lines, an automatic call distributor (ACD) 26b, and an interactive voice response unit (IVRU) 26c connected in a manner well known to those skilled in the art of telephone communications.

CPU 21 can also store information to, and read information from, a data storage device 27, such as a magnetic, optical, or equivalent type storage device. This data storage device 27 includes a message database 27a, a message access database 27b, a caller database 27c, and a message archive 27d, which are described below. Optionally, any of the information that is stored in the data storage device 27 may also be stored at a remote location (not shown) to provide a back-up version in the event of data loss.

The program that is executed by the CPU 21 (the operation of which is described below) may be stored in the data storage device 27, the RAM 23, or the ROM 22. This program controls the operation of the CPU 21, which in turn controls the operation of the audio vault.

A cryptographic processor 28 is connected to CPU 21 and data storage device 27. This cryptographic processor 28 has the capability of generating crypto-keys, and encrypting and decrypting information.

Figure 6:
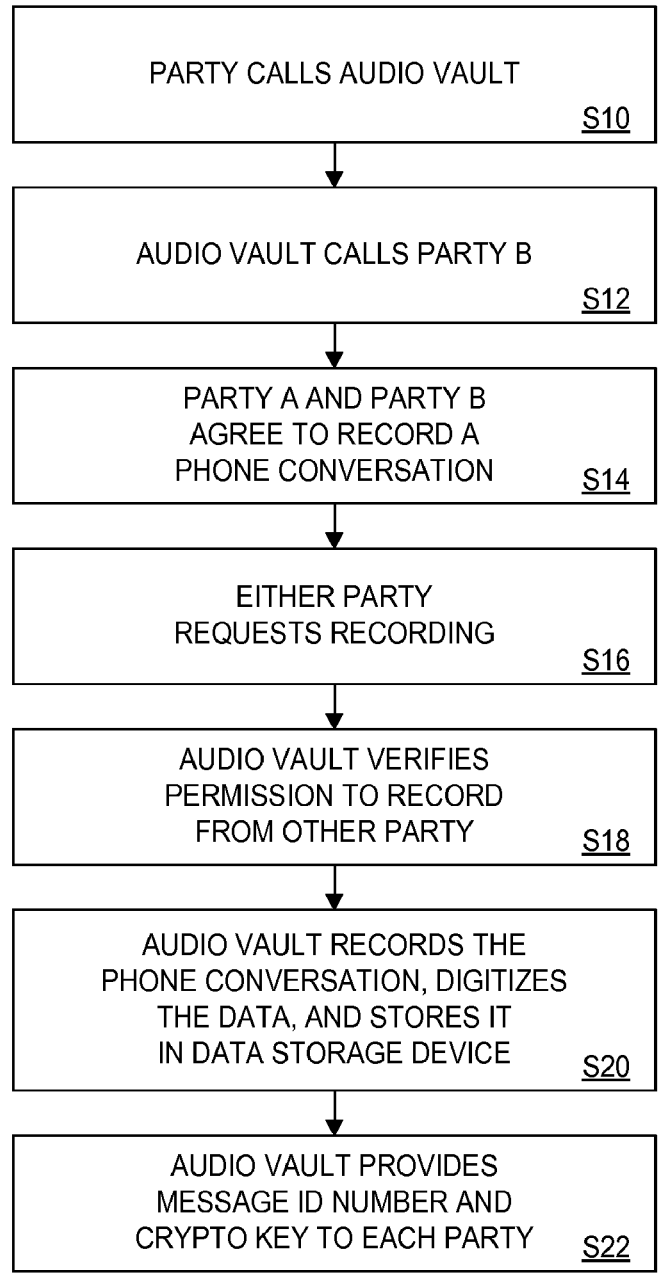
FIG. 6 is a high-level flow chart depicting the recording of audio information.

FIG. 6 is a high-level flow chart depicting the operation of the audio vault. The process begins in step S10 when a first party (party A) places a call to the audio vault. This incoming call is handled by PBX 26a and the associated ACD 26b. The call can be a "900" number call, with billing services provided by the service provider, as is known conventionally with 900 number services. Alternatively, the call can be to a conventional direct dial number or an 800 number, and a customer's credit card account can be charged for the service. Other billing options for the use of the audio vault include, for example, a flat monthly fee, billing by a long distance service provider, prepaid phone cards, and the like.

After the first party has established a connection with the audio vault, a connection with the second party (party B) must be established. This is depicted in step S12 where the audio vault 12 places a call to party B. In this case, the telephone number of party B is provided to the audio vault 12 by calling party A. Alternatively, instead of having the audio vault initiate the call to party B, party B may call in to the audio vault. In this case, party B provides an identification number or password, pre-established between parties A and B, that enables the audio vault to match party B's call to party A's call, with the audio vault making the connection between the two calls.

After the connections are established between the audio vault 12 and both parties, the audio vault conferences the two calls together, which provides an audio connection between the parties. This allows the parties to talk directly to each other. At this point nothing is being recorded without the consent of all parties to the conversation. If, during the conversation, the parties agree to record their conversation (as shown in step S14), one of the parties sends a recording request to the audio vault (as shown in step S16). This can be accomplished, for example, by pressing one or more buttons on a touch tone telephone. Alternatively, the audio vault 12 can be programmed to listen to the conversation using a voice recognition processor to determine when a request for recording has been made. Receiving the request to initiate the recording may be accomplished using any number of standard techniques well known to those skilled in the art. Next, in step S18, the audio vault 12 asks for verification of permission to record from the other party. For example, the audio vault 12 may generate an audio statement querying the second party "Do you agree to begin recording"? The second party may respond using the touch tone keys or with a voice command, and the response is interpreted in the same way as the initial request to start recording.

Next, in step S20, the audio vault 12 records the phone conversation and stores it in the data storage device 27. The conversation is digitized and encrypted by cryptoprocessor 28, so that it can only be decrypted using the appropriate decryption key.

Finally, in step S22, the audio vault provides a message ID number and a crypto-key to the parties. The message ID and crypto-key can be used subsequently to retrieve the encrypted information recorded by the parties during the call. While depicted as being provided at the end of the call, the message ID and crypto-key could also be provided at any time during the call.

FIG. 3 depicts a message database 27a, which is used to describe each message stored by the audio vault. The fields of this database include a message ID number, the name and telephone number of the first calling party (who initiated the call), the telephone number of the second party, the date of the call, the message start time and end time, and a security level for the stored data.

A unique message ID number is assigned to each stored message. The message ID number is used as an index into the message database 27a, as well as the message access database 27b and the message archive 27d and it may be used to retrieve the message from the message archive. The message ID number also appears as an entry in the caller database 27c.

The remaining fields of the message database describe the various parameters associated with each stored message. The telephone number of all incoming calls may be extracted by the ACD using automatic number identification (ANI). The telephone number of any call placed by the audio vault is, of course, known in advance. The name of the first party may be determined by using the first party's telephone number as an index into a look up table. Alternatively, it may be determined using caller ID or by asking the caller, via the IVRU, to input his name. The date, starting time, and ending time of the message are generated by clock 24 and stored in message database 27a.

Different levels of security may be provided by the audio vault, and the security level for each recorded call is stored in the message database 27a. For example, one level of security could be digitally storing and encrypting the audio information. With this level of security, the caller must provide a crypto-key to retrieve and decrypt the stored message in addition to the message ID number. A higher level of security could be obtained if the key is only provided to a third party such as the court or an attorney. In this case, only the third party will be able to access the message once it has been stored by the user. Another level of security could allow access to the message only when one or more access codes are provided. Other levels of security can be readily envisioned. The security level field may also be used to describe the format of the encryption, if multiple encryption options are provided.

FIG. 4 shows a message access database 27b that includes a record for each recorded message, and is used to store the first and second party message access codes for each message. Every recorded message has an associated record in this database, indexed by the message ID number. The first party access code and the second party access code are stored.

The access codes may be used to provide increased security for certain embodiments of the audio vault 12. In one embodiment, access to playback of the message will be granted if either the first party access code or the second party access code is provided to the audio vault. Access to modify the message, however, will only be granted if both the first party access code and the second party access code are provided.

Other embodiments of the audio vault do not require a message access code to access the message, and will allow access using only the crypto-key and the message ID number. Other message access arrangements can be readily envisioned.

While the various message access arrangements are described above in terms of alternative embodiments, the audio vault can be implemented to allow a different access option for each stored message on an individual basis. The security level field in the message database may be used to store the message access option to be used for each message. Alternatively, an additional field may be added to the message access database 27b for this purpose.

FIG. 5A depicts the fields of a caller database 27c which is used to index all messages by individual callers or customers. This database includes fields for the name of the caller and a caller identification number that is uniquely assigned to each caller. The ANI field stores the telephone number of the caller, and it can be used to identify a caller from the ANI information received from incoming calls. Finally, a list of all the message ID numbers associated with each caller is also stored in the caller database 27c. This database can be accessed by caller name to provide a list of messages that belong to a given caller. It can also be accessed by message ID number to determine the name of the caller for any given message.

Figure 5B:
FIG. 5B is a table describing a preferred set of fields for the message archive of FIG. 2.

FIG. 5B depicts the message archive 27d that is used to store the messages themselves. The message archive has a record for each message, which allows the message to be retrieved using the message ID number. Although the messages depicted in the figure are short, longer messages may also be stored in the message archive, as the primary function of the message archive is to store the digitized and encrypted audio information (i.e., the contents of a conversation). Optionally, additional data may be stored in the message archive 27d together with the message, either embedded in the message, or in separate fields. This additional data could include, for example, any of the data that is stored in the databases described above.

Alternatively, the message may be stored directly in the message database, and the message archive can be omitted.

Figure 7A:
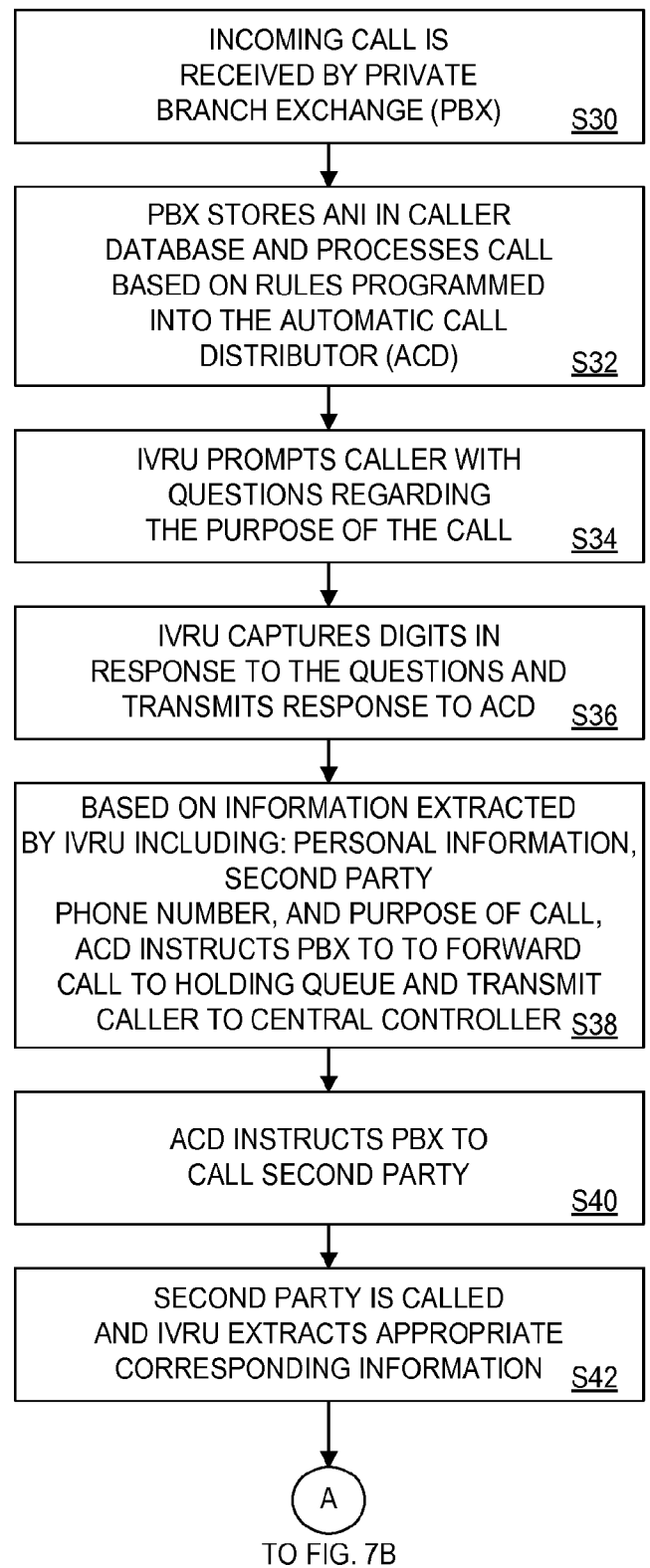
FIGS. 7A and 7B are flow charts depicting the processing of an incoming call and the establishing of connections between the central server and the parties.
Figure 7B:
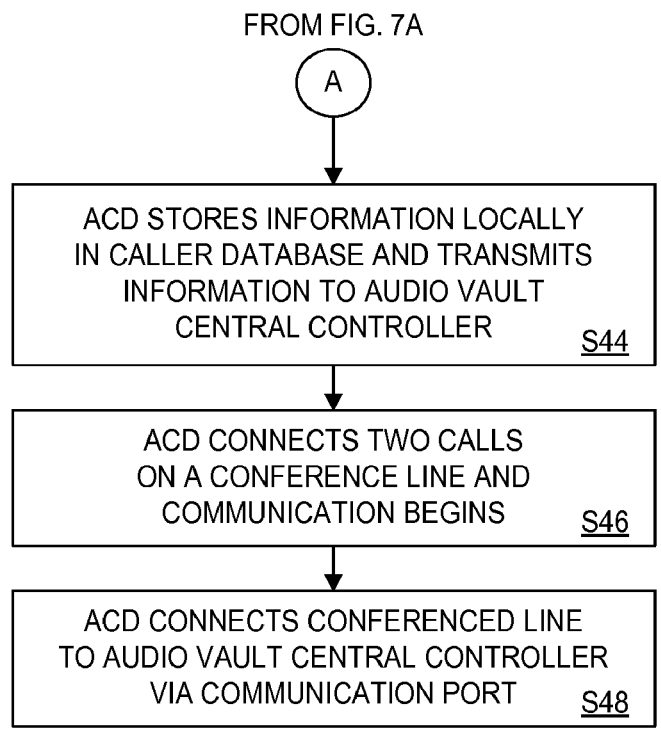

FIGS. 7A and 7B depict the process of establishing the connections between the parties and the audio vault and the processing of caller information by the audio vault. Where a party places a call to the audio vault service, the call arrives, as an incoming call, at call center PBX 26a associated with the audio vault in step S30. The PBX extracts the telephone number of the incoming call using automatic number identification (ANI). In step S32 the PBX 26a stores the caller's number locally in caller database 27c and decides how to process the call based on rules programmed in the ACD. Next, in step S34, the audio vault obtains information about the incoming caller. This is accomplished by connecting the call to an IVRU 26c. The IVRU 26c prompts the caller with questions regarding the purpose of the call, and the responses to these questions determine the functions to be performed by the audio vault 12. For example, the IVRU 26c can request information about the number of parties to be included in the call, and the level of security to be associated with the call. The IVRU 26c may also request personal information about the first party (the party who initiated the call), the telephone number of the other party to be included in the call, and optional additional information about the other party. In step S36, the IVRU 26c captures the response of the first party to the questions asked in step S34. The responses to these questions are processed by the ACD, where it is determined what action must be taken in order to fulfill the terms of the caller. Steps S34 and S36 may be repeated as many times as necessary when multiple pieces of information must be obtained. The IVRU 26 would thus prompt the caller for the first piece of information, then receive the first information. Subsequently, the IVRU 26c would prompt for and receive a second piece of information. This process continues until the IVRU has captured all of the required information.

In step 38, the ACD 26b instructs PBX 26a to forward the incoming call to a holding queue. The personal information, the second party's phone number, and the purpose of the call are all stored in the appropriate record and remain logically linked with the call. The call data is then transferred to the central controller. In step S40, the ACD 26b instructs the PBX 26a to place a call to the second party, and the PBX 26a initiates the call in step S42. When the call is connected, it is routed to the IVRU 26c which will extract the appropriate information from the second party (similar to the information extracted from the first party). In step S44, the ACD 26b takes the information received from the second party and stores it locally in a caller database 27c. The ACD also transmits this information to the audio vault central controller. After processing the information from the second caller, in step S46 ACD 26b conferences the call from the first party and the second party together. Communication between the parties can then proceed as it would with an ordinary telephone conversation. In step S48, ACD 26b connects this two-party conference call to the audio vault central controller via the communication port 25. At this point, the audio vault 12 monitors the conversation between the two parties via the communication port 25, but does not record the conversation.

As an alternative to having the audio vault initiate the second call (as depicted in step S40), the audio vault can wait for a second incoming call to arrive. With this arrangement, the parties must agree between themselves to call the audio vault at the same time, so that their calls can be connected and recorded by the audio vault. When this arrangement is used, the incoming calls may be matched with one another using a prearranged identifier that is extracted via the IVRU 26c.

Figure 8:
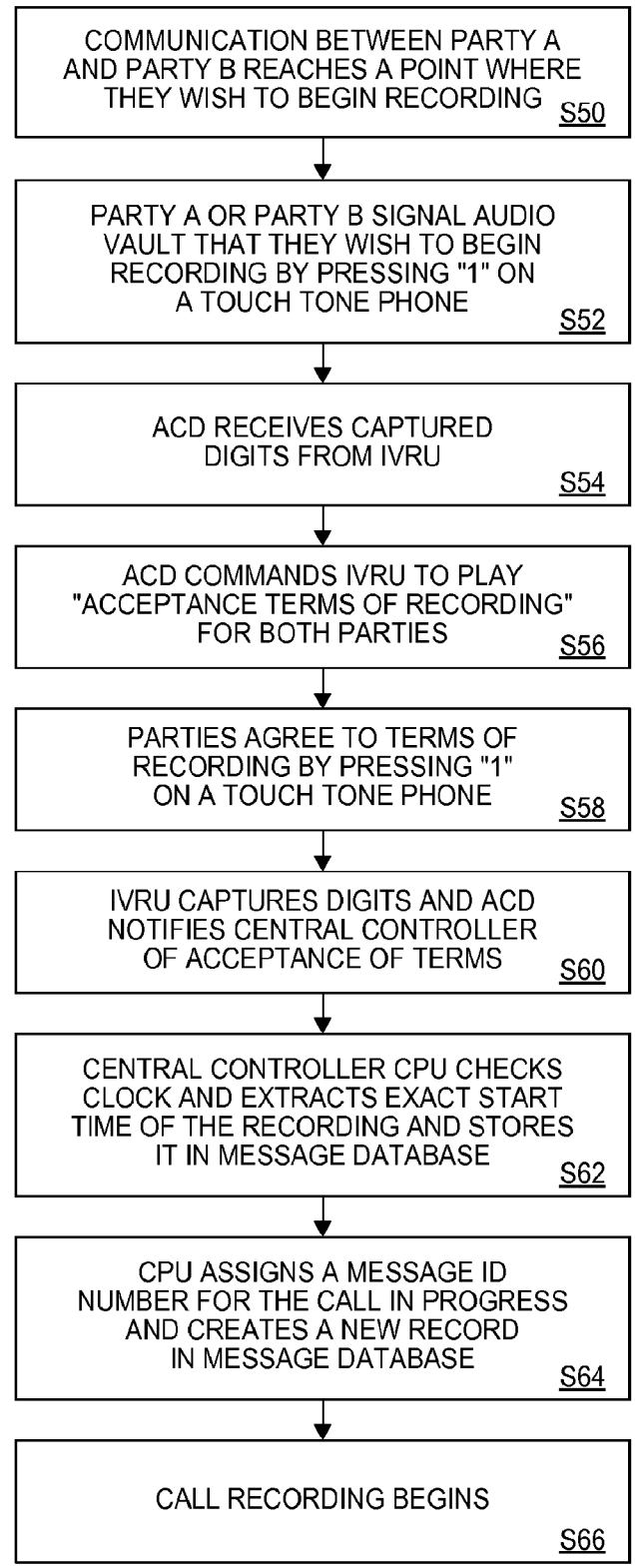
FIG. 8 is a flow chart depicting the pre-recording processes performed in accordance with the present invention.

FIG. 8 depicts the initiation of the recording process, assuming an ongoing conversation has already been set up by the audio vault. In step S50, the communication between the second parties reaches a point where they wish to begin recording their conversation. Either party can initiate the recording by sending a signal to the audio vault 12, in step S52, requesting the audio vault to begin recording. This may be accomplished by pressing an appropriate key on a touch tone telephone keypad. The IVRU 26c will capture the keystroke and send it to the ACD 26b. In step S54, ACD 26b receives the digits captured by the IVRU 26c. Of course, instead of using a keystroke on a touch tone phone, other methods may be used to initiate the recording. For example, the audio vault may recognize for the phrase "begin record-ing" using voice recognition. Numerous other methods for activating the recording function of the audio vault will be apparent to those skilled in the art.

In step S56, the ACD 26b commands the IVRU 26c to play a pre-recorded notice indicating that recording will begin shortly, and asking the parties to consent to the recording. In step S58, the parties indicate that they agree to have their conversation recorded by either pressing an appropriate button on the touch tone phone or by a voice response similar to the voice response described above. In step S60, the IVRU 26c captures the response of the parties and forwards it to ACD 26b. If they have so agreed, the ACD 26b then notifies the central controller that the parties have agreed to have their conversation recorded. Permission to record could take place earlier, be built into registration, or skipped altogether if laws permit.

In step S62, the central controller CPU 21 checks the clock 24 and determines the exact starting time of the recording. The central controller then stores this starting time in the message database 27a. In step S64, the CPU 21 assigns a message ID number to the call. It also creates a new record in the message database 27b, which can be accessed using the message ID number. Then, in step S66, recording of the call begins.

Figure 9:
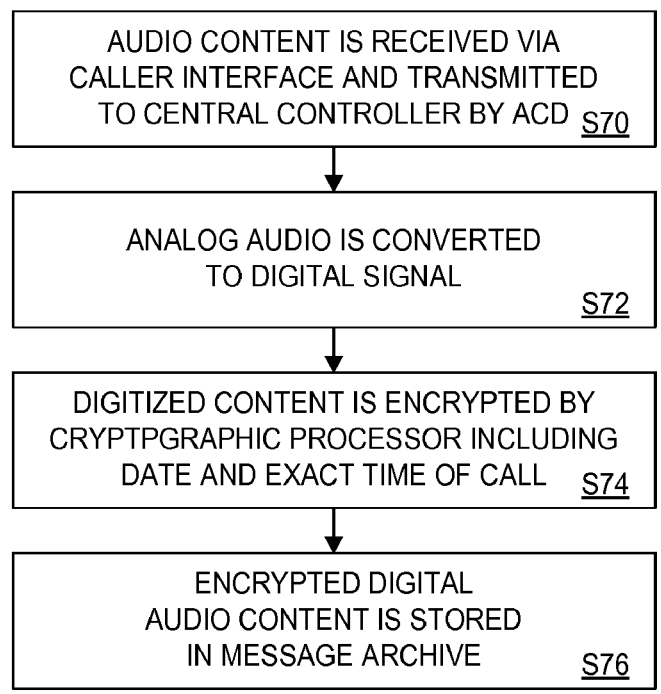
FIG. 9 is a flow chart depicting the recording of audio information in accordance with the present invention.

FIG. 9 depicts the process of recording information in the audio vault. In step S70, the audio content of the conversation is received via a caller interface such as IVRU 26c coupled to ACD 26b, and transmitted to the CPU 21 by the ACD 26b. In step S72, the audio message signal, which until now has been maintained in an analog format, is converted to digital data by CPU 21. In step S74, the digitized audio message data is encrypted by cryptographic processor 28. The date and the exact time of the call is embedded in the digitized audio data. In step S76, the encrypted digital audio content of the conversation is stored in the message archive 27d. This step continues as long as additional audio information continues to arrive from the parties. Additional time stamps, similar to the one embedded in step S74, may be added to the audio data at various intervals. Further, caller information such as name, telephone number, caller ID and the like, can be incorporated into the encrypted message to provide an additional level of security.

Figure 10:
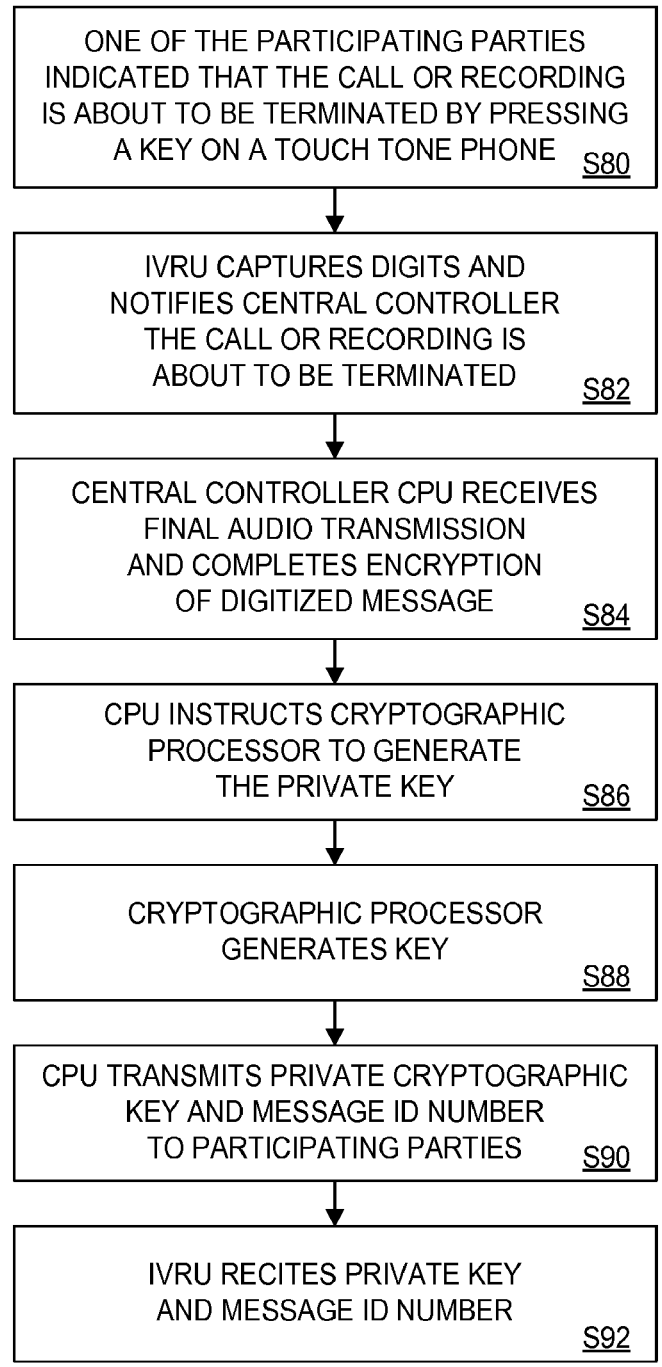
FIG. 10 is a flow chart depicting the end of the recording process in accordance with the present invention, including the distribution of the cryptographic keys.

Referring now to FIG. 10, when a party wishes to stop the recording, the party presses a key on a touch tone telephone, as depicted in step S80. In step S82, IVRU 26c will capture this touch tone command and ACD 26b will notify the central controller that the recording should be terminated. Likewise, if the line or connection is dropped, the recording is terminated. In step S84, the central controller receives the final portion of the audio transmission, and then completes the encryption of the digitized message. Optionally, an additional time stamp may be embedded in the audio information at this point. In step S86, the CPU 21 instructs the cryptographic processor 28 (shown in FIG. 2) to generate a symmetric key. In step S88, the cryptographic processor 28 generates a symmetric key that will ultimately be used to decrypt the encrypted information. In step S90, the CPU 21 transmits the symmetric cryptographic key to the IVRU 26c. The CPU 21 also transmits a message ID number to the IVRU 26c. Finally, in step S92, the symmetric key and the message ID number are distributed by having the IVRU 26c provide them in audio format to the parties participating in the call.

In the embodiment described above, one key and message ID number is provided to each of the parties to the conversation. Any party to the conversation can subsequently use the key and the message ID number to retrieve the conversation. In one embodiment, in order to maintain the integrity and security of the message, none of the parties may authorize the deletion or modification of the recorded message.

In an alternative embodiment modifications of the message can be requested by the participants in the conversation. This embodiment uses a set of access codes in addition to the message ID and decryption key. Each party to the conversation receives a unique access code, and any given party does not know the access codes of the other parties. Only when all of the access codes have been collected by the audio vault will the audio vault permit the modification of a recording. It should be noted that in this embodiment, the same crypto-key and message ID are provided to each of the parties, and any party can obtain playback of the conversation by providing the message ID, the crypto-key, and their unique access code. The system may also be configured to allow playback using only the crypto-key and the message ID, without providing an access code. This may be useful, for example, when an employer wants his employees to have access to play a recording only, without authorizing the employees to modify the recorded information.

Another embodiment of this invention uses two crypto-keys and a single message ID for each recorded conversation. The message is encrypted so that either of the two keys will enable the audio vault to decrypt the recording. The message ID plus a one of the two crypto keys are distributed to each party. When the system is implemented in this manner, any party can play back a message by providing his decryption key and the message ID to the audio vault. When both crypto-keys are received, the system will also authorize modification or deletion of the recorded message. No access codes are needed in this embodiment.

Figure 11:
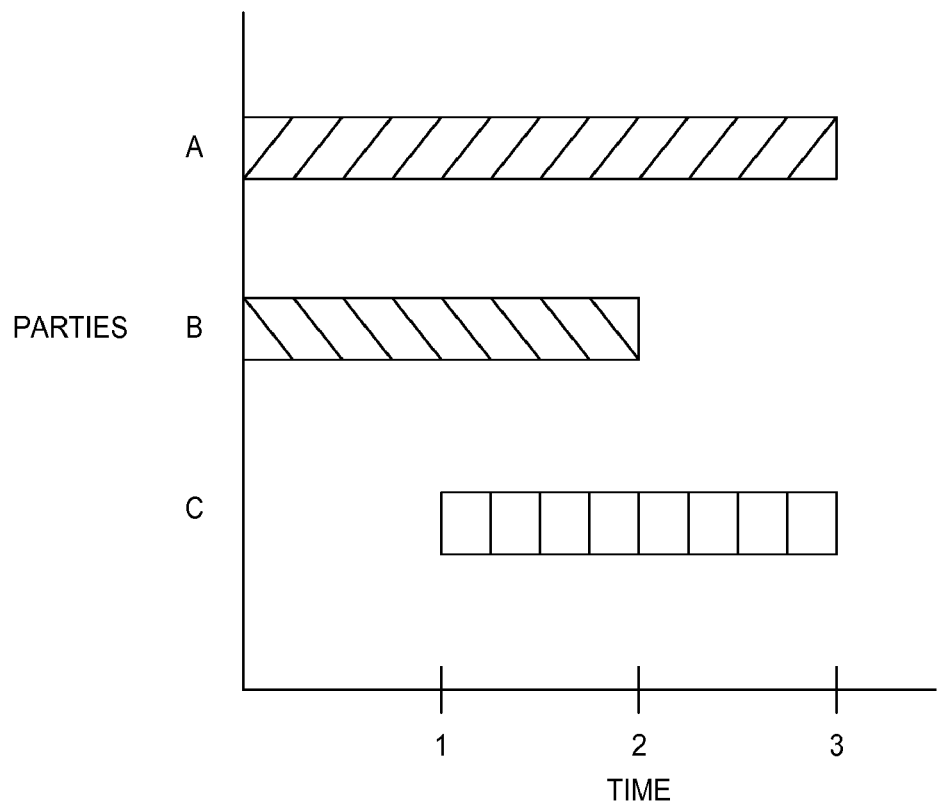
FIG. 11 is a time line depicting participation in a multi-party call being recorded in accordance with the present invention.

Yet another embodiment of this invention is provided for use where multiple parties participate in different sections of a single conversation. In this embodiment, the audio vault provides each party with access to only those portions of the conversation in which he participated. For example, a conversation may occur in which party A speaks with party B for one minute. Then, party C is conferenced into the call, and the conversation continues for an additional minute. Next, party B hangs up, and parties A and C continue to speak for an additional minute. In this example, party A was present during the whole conversation, party B was present for only the first two minutes, and party C was present for only the last two minutes. This is represented schematically in FIG. 11, where time-axis represents time in minutes.

By storing a digitized encrypted copy of the conversation customized for each participant, the audio vault can selectively provide playback access to only those portions of the conversation in which a given party participated. In this example, because party A participated during the whole conversation, As copy will contain all three minutes of the conversation. Because party B participated in only the first two minutes of the conversation, B's copy will contain only those two minutes Similarly, because party C participated in only the last two minutes of the conversation, C's copy will contain only those two minutes.

In a further extension of this embodiment, the audio vault 12 stores the input received from each individual line as a separate message with its own message ID. Thus, the words produced by each participant are stored separately. In a conversation between four people, it would thus be possible for one party to hear the conversation of three participants, but be precluded from listening to the fourth participant. Using the example depicted in FIG. 11, there are three separate lines coming into the audio vault 12. Each line has its own unique stream of digital data being stored in separate records in the message archive. If party B wants access to his segment of the conversation, the Audio vault 12 retrieves the appropriate segment and provides the data to him If party B wants to hear the input from party A and party C as well, they would need to provide the necessary access means for him to listen to their segments of the conversation.

Selective access can be implemented by providing a unique crypto-key and access code to each participant, which will enable him to access only his customized copy of the conversation.

While the embodiments described above involve two or three callers connected to the audio vault on separate telephone lines, these embodiments can be easily extended to serve any number of callers connected on separate telephone lines.

An alternative embodiment using only one telephone line may also be implemented, as depicted in FIG. 1D. This embodiment may be used by individuals to unilaterally record information in a secure manner. The operation is as described above, the message received from the simple connection and only one message ID and crypto-key being generated. The system could be used, for example, to record a last will and testament. Optionally, the crypto-key could be provided to a trusted third party such as an attorney. The system could also be used to record an invention disclosure to prove that a person conceived of an invention before a given date. Other applications can be readily envisioned.

The single telephone line embodiment can also be used to record two-party conversations if the parties to an ordinary telephone conversation place a conference call to the audio vault. The audio vault would then receive this conference call on a single telephone line. In this embodiment, however, the audio vault will not be able to automatically determine the identity of all of the parties. Accordingly, the audio vault can query the parties and ask them to provide their telephone numbers or other identifying information using the IVRU capabilities. The audio vault could identify the parties using a voice recognition system, or only provide one crypto-key and message ID for use by all of the callers.

As yet another alternative embodiment, also depicted in FIG. 1D, the audio vault may be implemented as a stand-alone device that is not connected to a telephone line. In this embodiment, the audio vault will resemble a traditional digital audio recorder but will further include a cryptographic processor, input means (such as a keyboard or a voice recognition unit) for receiving identification information from the users, and output means for providing cryptographic keys to the user. The output means could include, for example, a speech synthesis circuit or an alphanumeric display. This stand-alone audio vault can also embed time stamps into the digitally stored and encrypted information. The time stamping information may be derived locally from an internal, tamper proof clock. Alternatively, the time stamp information may be received via radio transmissions from a remote location. The system could further obtain location information from a global positioning satellite (GPS) system or by triangulating cellular phone signals, and this location information can be recorded along with the audio information.

Numerous modifications to the embodiments described above can be readily envisioned. For example, audio vault may be implemented on an internal corporate telephone system. Or instead of using telephone lines to connect the users to the server, a computer network connection may be used to link parties that own computers. In a further embodiment, the present invention may also be implemented by connecting to the parties over the Internet, where communications are transmitted in packets.

In another embodiment, the timestamp associated with each stored message also includes representations of one or more previous message timestamps, to provide an additional degree of message timestamp assurance. For example, a hash value of the last three timestamps can be stored in memory for incorporation into the current timestamp. The hash values are calculated by applying a hash algorithm to the cleartext timestamps. The following example illustrates this technique. Four messages are received and stored by the audio vault with the first message stored at nine hours, thirty-one minutes and twenty seconds ("09:31:20"). The second, third, and fourth messages are stored at 09:31:50, 09:32:10, and 09:32:30, respectively. The timestamp hash value associated with the fourth message received is computed as follows:

Fourth Message Timestamp Hash Value=Hash (09:31: 20)+Hash (09:31:50)+Hash (09:32:10)+Hash (09:32:30).

Thus, the hash values for each message relate to their respective previous three messages. Such hash chaining discourages fraudulent modification of timestamps.

Suppose a forger discovers the private key used to encrypt the timestamp of the message stored at 09:31:50 and uses it to change both the cleartext and hashed parts of the timestamp. A suspicious party could then challenge the integrity of the 09:31:50 timestamp by recomputing the appropriate timestamp hash values of the subsequent three stored messages. If the recomputed hash values do not match the expected hash values, the 09:31:50 timestamp is demonstrated to have been altered. When tampering is generally suspected but no specific timestamp is in question, an altered timestamp can be determined by recomputing the most recent stored timestamp and continuing backwards until three successive incorrect timestamps are found. Of course, the forger could theoretically change all the timestamps in the chained hash, but this would require more effort than changing just the desired one, and would increase the chances of detection.

In addition to hashing the timestamp associated with each message, the audio vault may compute the hash value of the stored audio signals, incorporating the hash values into the timestamp of subsequent messages, or even into the stored audio of subsequent messages. Attempts to alter a message would therefore be evident from the recalculation of subsequent hash values. The uses and advantages of hash functions are discussed generally in Schneier, "Applied Cryptography" (2d ed. 1996), chapter 18. Suitable conventional hash algorithms include the Secure Hash Algorithm (SHA) developed by the National Institute of Standards and Technology.

Certain well-known enhancements to public key cryptography can also be used to provide greater security. For example, the message could include a digital certificate for public key distribution to parties that do not know the message public key needed to verify a timestamp encrypted with the message private key. In such a digital certificate, the message public key is encrypted (and vouched for) by the private key of a trusted agent whose public key is known to the recipient. The recipient uses the certifier's public key to decrypt the message public key, then uses the message public key to verify the timestamp. Alternatively, the recipient could simply obtain the message public key from a publicly accessible database, eliminating the need for digital certification.

To provide an additional measure of security, digital signatures may be generated and stored in the message database, or alternatively embedded in the audio information stored in the message archive.

To this point, asymmetric (public key) encryption has been discussed in the context of the various cryptographic operations. However, symmetric (e.g., DES) key encryption is also possible, either as a replacement for, or adjunct to (e.g., a symmetric session key transmitted using public key cryptography) public key cryptography.

The uses and advantages of digital signatures are discussed generally in Schneier, "Applied Cryptography" (2d ed. 1996), chapter 2.

By providing a system as described above, the audio vault can maintain audio records that are authenticatable as to both time and content of a conversation.

While the invention has been described above in terms of specific embodiments, it is to be understood that the invention is not limited to the disclosed embodiments. On the contrary, this invention is intended to cover various modifications and equivalent structures included within the spirit and scope of the appended claims.

We claim:

1. A method comprising:
   receiving, by the central server, audio content data from a first party;
   encoding the audio content;
   storing, by the central server, the encoded audio content;
   determining, by the central server, a key for decoding the encoded audio content;
   transmitting the key to the first party;
   generating a first access code that can be used to obtain access to the stored encoded audio content; and
   transmitting, by the central server, the first access code to the first party.

2. The method of claim 1, further comprising:
   transmitting the key to a second party;
   generating a second access code that can be used to obtain access to the encoded audio content; and
   transmitting the second access code to a second party, in which the second access code is different than the first access code, and in which the second party is different than the first party.

3. The method of claim 1, further comprising:
   storing the first access code in association with the encoded audio content.

4. The method of claim 1, wherein the encoded audio content is obtained from a telephone communication between the first party and another party.

5. The method of claim 1, in which establishing communication comprises:
   establishing connection between a calling party and a called party via the internet.

6. The method of claim 1, in which encoding the audio content comprises:
   encrypting, via a cryptographic processor, the audio content.

7. The method of claim 1, further comprising:
   receiving the first access code from the first party;
   receiving the key from the first party;
   decoding the encoded audio content using the received key; and
   transmitting the decoded audio content to the first party.

8. The method of claim 7, further comprising:
   storing, by the central server, an indication that the decoded audio content was transmitted to the first party.

9. The method of claim 7, further comprising:
   verifying, by the central server, the received first access code; and
   verifying, by the central server, the received key.

10. The method of claim 1, in which the first access code comprises a timestamp associated with the audio content.

11. A system comprising:

a processor;

a cryptographic processor in communication with the processor; and a storage device in communication with the processor, the storage device storing instructions configured to direct the processor to perform a method, the method comprising:

identifying audio content communicated between at least two parties; encoding, via the cryptographic processor, the communicated audio content;

storing the encoded communicated audio content;

determining a key for decoding the encoded communicated audio content;

transmitting the key to a first party of the at least two parties;

generating a first access code that can be used to obtain access to the stored encoded communicated audio content; and transmitting the first access code to the first party of the at least two parties.

12. The system of claim 11, the instructions being further configured to direct the processor to:

transmit the key to a second party of the at least two parties;

generate, via the cryptographic processor, a second access code that can be used to obtain access to the encoded communicated data; and transmit the second access code to a second party of the at least two parties, in which the second access code is different than the first access code, and in which the second party is different than the first party.

13. The system of claim 11, the instructions being further configured to direct the processor to:

associate the first access code with the encoded communicated audio content.

14. The system of claim 11, in which establishing communication comprises:

establishing a telephone connection between a calling party and a called party.

15. The system of claim 11, in which establishing communication comprises:

establishing connection between a calling party and a called party via the internet.

16. The system of claim 11, in which encoding the communicated audio content comprises:

encrypting, via the cryptographic processor, the communicated audio content.

17. The system of claim 11, the instructions being further configured to direct the processor to:

receive the first access code from the first party;

receive the key from the first party;

decode, via the cryptographic processor, the encoded communicated audio content using the received key; and transmit the decoded communicated audio content to the first party.

18. The system of claim 17, the instructions being further configured to direct the processor to:

store an indication that the decoded communicated audio content has been transmitted to the first party.

19. The system of claim 17, the instructions being further configured to direct the processor to:

verify the received first access code; and verify the received key.

20. The system of claim 11, in which the first access code comprises a timestamp associated with the communicated audio content.

* * * * *